G. G. ROSS.
RECORD RACK CABINET.
APPLICATION FILED SEPT. 27, 1920.

1,394,864.

Patented Oct. 25, 1921.
2 SHEETS—SHEET 1.

Inventor
George G. Ross,
By Watson E. Coleman
Attorney

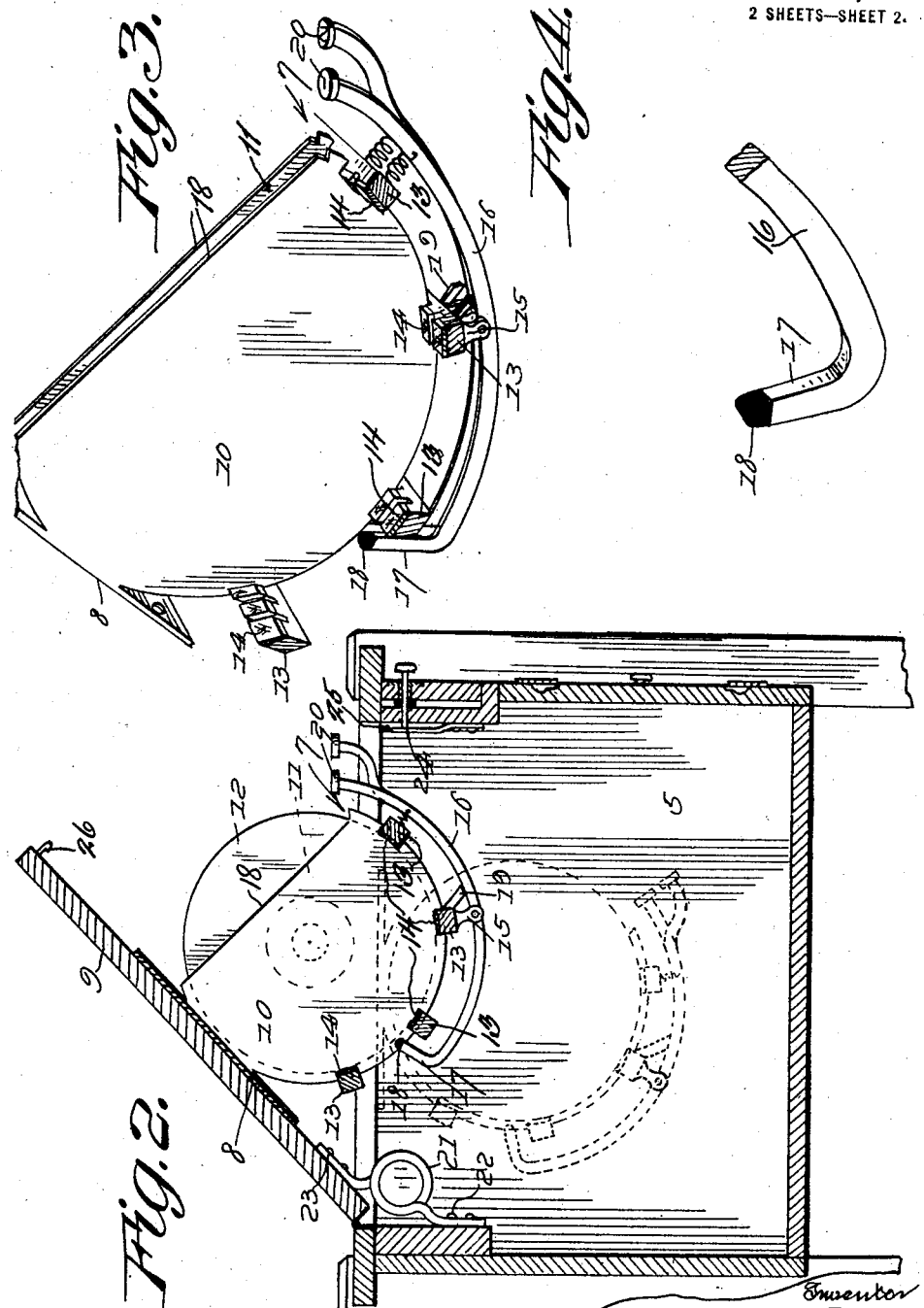

UNITED STATES PATENT OFFICE.

GEORGE G. ROSS, OF SOUTH GREENSBURG, PENNSYLVANIA.

RECORD-RACK CABINET.

1,394,864.

Specification of Letters Patent.    Patented Oct. 25, 1921.

Application filed September 27, 1920. Serial No. 412,921.

*To all whom it may concern:*

Be it known that I, GEORGE G. ROSS, a citizen of the United States, residing at South Greensburg, in the county of Westmoreland and State of Pennsylvania, have invented certain new and useful Improvements in Record-Rack Cabinets, of which the following is a specification, reference being had to the accompanying drawings.

The purpose of the present invention is to provide an improved record rack cabinet in the form of a library table, wherein an extra compartment is afforded for a talking machine mechanism.

A further purpose is to provide a rack cabinet resembling a library table, and wherein a compartment is provided for the reception of the record rack, which is carried by the lid or closure for the compartment, in which the rack is received, there being means for automatically moving the lid or closure to an open position, when the lid or closure is released or unlocked.

A still further purpose of the invention affords the provision of means carried by the rack (which is supported on a lid or closure), to be finger or hand actuated, for ejecting the desired record a slight distance, so that it can be easily grasped, in order that the same may be quickly and readily moved for placement on the talking machine table.

An additional purpose of the invention resides in the fact that each of the record ejecting devices or means is numbered according and corresponding to the numbers given the records on a chart, where the records are numbered according to the names or titles of the records.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within scope of what is claimed.

The invention comprises further features and combination of parts, as will be hereinafter set forth, shown in the drawings and claimed.

In the drawings:—

Fig. 2 is a sectional view on line 2—2 of Fig. 1, showing the rack carried by the lid or closure, the lid being open in full lines, and closed in dotted lines, and showing the ejectors.

Fig. 3 is an enlarged detail view of a portion of the rack as separated from the cabinet and the compartment in which the rack is normally received.

Fig. 4 is a detail view of a portion of one of the levers 16.

Figure 1:
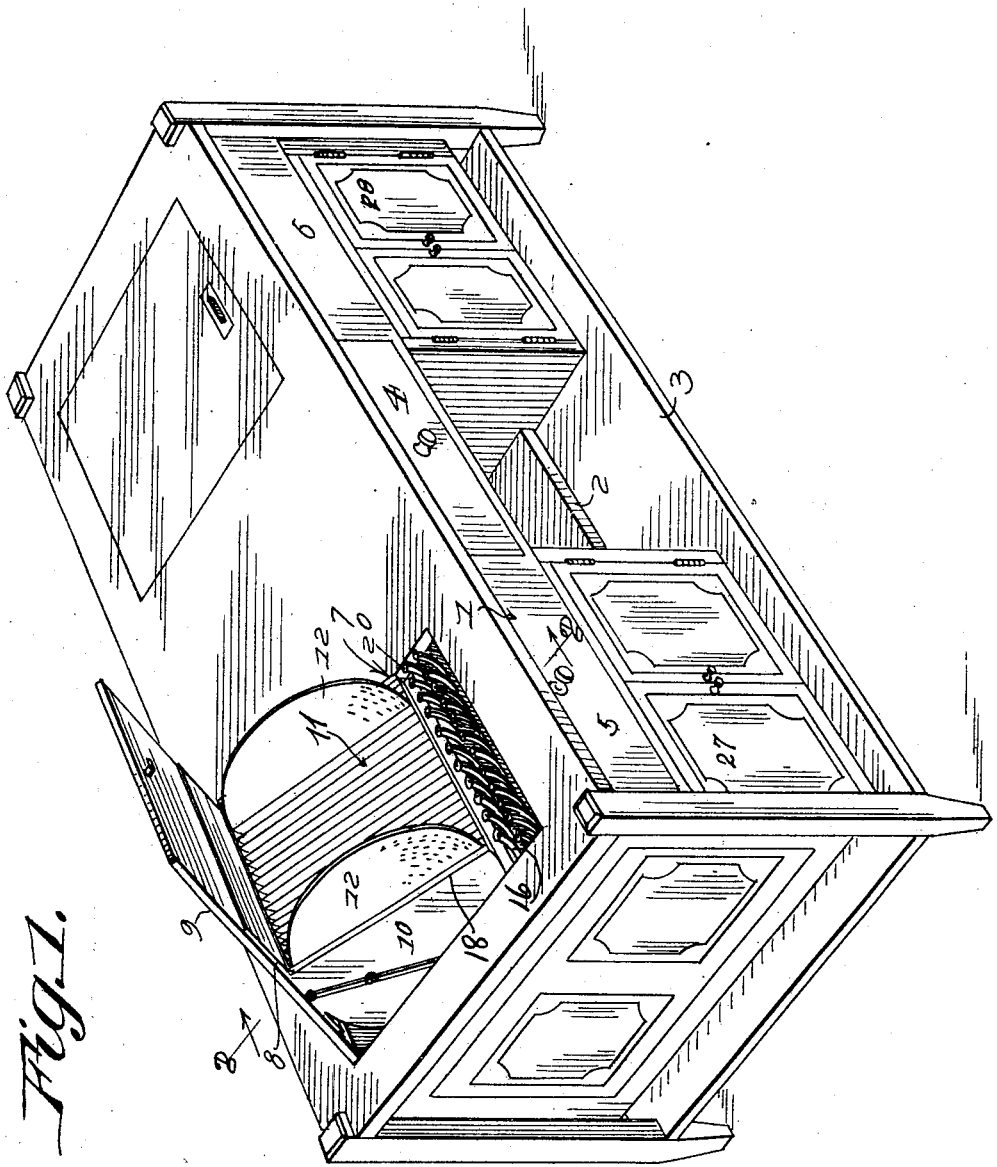
Figure 1 is a view in perspective showing the improved record rack cabinet, which is constructed to resemble a library table, showing the lid or closure of the record compartment open, and the records mounted in the grooves of the latter, and illustrating the pressing knobs of the various record ejectors.

Referring more especially to the drawings, 1 designates a record rack cabinet, which may be any suitable shape, or configuration, but in the present instance it is designed to resemble the form of an elongated library table having the usual supporting shelves 2 and 3, and a drawer 4. Also in the present instance the cabinet is provided with compartments 5 and 6 at its opposite ends, one for the reception of a record rack (which is designated as a whole by the numeral 7), while the other is designed for the reception of a conventional form of talking machine mechanism (not shown). The compartments 5 and 6 have front doors or closures 27 and 28.

The record rack 7 comprises a frame 8, which may be fastened in any suitable manner to the underfaces of the lid or closure 9, designed for closing the compartment 5.

The frame 8 comprises a plurality of spaced plates 10, the spaces 11 between the plates constituting compartments or grooves for the various records 12. Connecting the edges of these plates are cross-pieces or supporting bars 13, which have upon certain faces felt strips 14, on which the edges of the records rest, thereby preventing injury to the edges of the records. Also by means of these bars or strips the division plates 10 are relatively braced, and carried by one of the strips or bars is a plurality of ears or lugs 15, spaced in pairs. Pivoted between each pair of lugs or ears is a record ejecting lever 16, which is arcuate concentric with the spaced plates and records. These levers have their rear ends terminating in projections 17, the terminals of which are provided with felt strips 18. The felt terminals of the projections 17 are located directly under the edges of the records, so that when any one of the levers is depressed, when the lid or closure is open, a record may be ejected. It will be noted that the plates 10 are not complete circular plates. In other words portions of the plates are cut away obliquely as indicated at 18. However, the plates are large enough, and there are sufficient of the bars or strips 13, so that when the lid or closure is in a closed position, the forwardmost strip or bar is positioned forward of the transverse center of the compartment of the cabinet, so as to retain the records in their respective grooves or compartments of the record rack.

It will be noted that the forwardmost strip or bar 13 is provided with a plurality of tension springs, which are connected to the ejecting levers, so as to hold them in contact with the stops or abutments 19. It will be noted that the felt terminals of the projections 17 are normally tangent with the peripheral edges of the records, so that when any one of the levers is depressed, when the lid is open, the desired records may be ejected.

The outer or forwardmost ends of the levers are provided with buttons 20, which are numbered according to the records, as numbered on a chart, which is designed to be used in connection with each rack or cabinet, and on which the records are numbered according to their titles.

At one end of the compartment in which the record rack is received it is provided with a coil spring 21, one end of which is attached at 22 to the inner faces of the cabinet, while its other end 23 is connected to the lid or closure. This coil spring is under tension when the lid or closure is in a closed position. A suitable spring latch 24 is carried by the front of the cabinet, and has a hook 25, to engage a keeper 26 of the lid, so that when the latch is released, the lid or closure will spring up by virtue of the expansive connection of the spring. When the lid is opened, as clearly shown, the various records may be ejected as they are wanted.

The invention having been set forth, what is claimed as being useful is:

1. A cabinet having a compartment, a lid therefor, a record rack carried by the lid and extending into the compartment when the lid is closed, said record rack having a plurality of record receiving compartments, a plurality of individual ejectors pivotally carried by the rack and concentric with each of the record compartments, said ejectors having arms tangent to and adapted to engage the edges of the records, whereby upon pressing any one of the ejectors, the desired record may be ejected, abutment to act as stops for the ejectors, and spring tensioning means for holding the ejectors in contact with the abutments.

2. A cabinet having a compartment, a lid therefor, a record rack mounted on the lid and extending into the compartment when the lid is closed, said rack comprising a plurality of record receiving compartments having open bottoms, strips extending across the bottoms for the support of the records, a plurality of arcuate ejectors pivotally mounted upon one of the strips whereby they assume positions concentric with the records when inserted, said ejectors having record ejecting arms tangent to the edges of the records and having cushions on their extremities to contact with the edges of the records, abutments adjacent the pivots of the arcuate ejectors for normally holding the cushions concentric with the records, tension springs carried by one of the strips and connected to the arcuate ejectors for holding the ejectors in contact with the abutments, one of the strips constituting means to be engaged by the ejectors for limiting them in their ejecting movements.

3. A cabinet having a movable member, a record rack on said member, said rack comprising a plurality of compartments, the bottoms of the compartments being open, spaced strips extending transversely of the bottoms for the support of records, arcuate ejectors pivotally mounted on one of said strips concentric with the records and having record ejecting arms, the extremities of the arms having cushions to engage the edges of the records, abutments adjacent the pivots for the ejectors for normally keeping the cushions concentric with the records, means for holding the ejectors in contact with the abutments, one of said strips constituting means to be engaged by the arcuate ejectors for limiting the ejectors in their ejecting movements.

In testimony whereof I hereunto affix my signature.

GEORGE G. ROSS.